(12) United States Patent
Martini et al.

(10) Patent No.: US 8,027,771 B2
(45) Date of Patent: Sep. 27, 2011

(54) METHOD AND APPARATUS TO MONITOR AN OUTPUT SPEED SENSOR DURING OPERATION OF AN ELECTRO-MECHANICAL TRANSMISSION

(75) Inventors: Ryan D. Martini, Royal Oak, MI (US); Charles J. Van Horn, Novi, MI (US); Peter E. Wu, Brighton, MI (US); Andrew M. Zettel, Ann Arbor, MI (US); Rezaul Karim, Canton, MI (US); Jeffrey R. Dec, Ann Arbor, MI (US); Sailaja Paladugu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 696 days.

(21) Appl. No.: 11/854,564

(22) Filed: Sep. 13, 2007

(65) Prior Publication Data

US 2009/0076679 A1 Mar. 19, 2009

(51) Int. Cl.
G06F 7/00 (2006.01)

(52) U.S. Cl. .............................. 701/51; 701/34; 701/53

(58) Field of Classification Search .................... 701/51, 701/53; 477/5
See application file for complete search history.

(56) References Cited

U.S. PATENT DOCUMENTS

| | | | | |
|---|---|---|---|---|
| 4,849,899 | A * | 7/1989 | Cote et al. ........................ | 701/63 |
| 5,896,083 | A * | 4/1999 | Weisman et al. ............. | 340/438 |
| 6,193,628 | B1 * | 2/2001 | Hrovat et al. ..................... | 477/3 |
| 6,832,148 | B1 | 12/2004 | Bennett | |
| 6,834,217 | B2 * | 12/2004 | Erban .............................. | 701/1 |
| 6,868,318 | B1 | 3/2005 | Cawthorne | |
| 6,896,078 | B2 * | 5/2005 | Wakui ............................. | 180/7.1 |
| 6,953,409 | B2 * | 10/2005 | Schmidt et al. ................... | 475/5 |
| 7,024,290 | B2 * | 4/2006 | Zhao et al. ...................... | 701/22 |
| 7,110,869 | B2 * | 9/2006 | Tao et al. ........................ | 701/34 |
| 7,154,236 | B1 | 12/2006 | Heap | |
| 7,286,917 | B2 * | 10/2007 | Hawkins et al. ................ | 701/34 |
| 7,351,182 | B2 * | 4/2008 | Kobayashi ........................ | 477/5 |
| 7,626,382 | B2 * | 12/2009 | Endo et al. ................ | 324/207.25 |
| 7,650,956 | B2 * | 1/2010 | Hirata et al. ................... | 180/248 |
| 7,690,457 | B2 * | 4/2010 | Nakanowatari .......... | 180/65.265 |
| 2002/0013195 | A1 * | 1/2002 | Ochi et al. ..................... | 477/143 |
| 2002/0123836 | A1 * | 9/2002 | Komiyama et al. ............. | 701/51 |
| 2003/0190995 | A1 * | 10/2003 | Aoki ................................. | 477/5 |
| 2004/0200654 | A1 * | 10/2004 | Hatsuda et al. ............... | 180/243 |
| 2005/0076958 | A1 | 4/2005 | Foster | |
| 2005/0077867 | A1 | 4/2005 | Cawthorne | |
| 2005/0077877 | A1 | 4/2005 | Cawthorne | |
| 2005/0080523 | A1 | 4/2005 | Bennett | |
| 2005/0080527 | A1 | 4/2005 | Tao | |
| 2005/0080535 | A1 | 4/2005 | Steinmetz | |
| 2005/0080537 | A1 | 4/2005 | Cawthorne | |
| 2005/0080538 | A1 | 4/2005 | Hubbard | |
| 2005/0080539 | A1 | 4/2005 | Hubbard | |
| 2005/0080540 | A1 | 4/2005 | Steinmetz | |
| 2005/0080541 | A1 | 4/2005 | Sah | |
| 2005/0182526 | A1 | 8/2005 | Hubbard | |

(Continued)

*Primary Examiner* — Mark Hellner
*Assistant Examiner* — Helal A Algahaim (57) ABSTRACT

There is provided a method to monitor a sensing system adapted to monitor an output of an electro-mechanical transmission. This includes monitoring rotational speed of a wheel operatively connected to a driveline operatively connected to the output of the electro-mechanical transmission. A first expected output of the transmission is determined based upon the output of the first sensor. A second expected output of the transmission is determined based upon a rotational speed of a torque-generative device operatively connected to the transmission. The first and second expected outputs and an output of the sensing system adapted to monitor the output of the electro-mechanical transmission are compared.

15 Claims, 3 Drawing Sheets

U.S. PATENT DOCUMENTS

| | | | |
|---|---|---|---|
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0017414 A1* | 1/2006 | Joe et al. | 318/432 |
| 2006/0194670 A1 | 8/2006 | Heap | |
| 2006/0207810 A1* | 9/2006 | Loew et al. | 180/65.2 |
| 2006/0276289 A1* | 12/2006 | Hirata et al. | 475/5 |
| 2007/0078580 A1 | 4/2007 | Cawthorne | |
| 2007/0093953 A1 | 4/2007 | Heap | |
| 2007/0099739 A1 | 5/2007 | Foster et al. | |
| 2007/0149348 A1 | 6/2007 | Holmes | |
| 2007/0179014 A1* | 8/2007 | Endo et al. | 477/3 |
| 2007/0191181 A1 | 8/2007 | Burns | |
| 2007/0225886 A1 | 9/2007 | Morris | |
| 2007/0225887 A1* | 9/2007 | Morris | 701/51 |
| 2007/0225888 A1* | 9/2007 | Morris | 701/51 |
| 2007/0225889 A1* | 9/2007 | Morris | 701/53 |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0017427 A1* | 1/2008 | Nakanowatari | 180/65.2 |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Aettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0112412 A1 | 4/2009 | Cawthorne | |
| 2009/0118917 A1 | 5/2009 | Sah | |
| 2009/0144002 A1 | 6/2009 | Zettel | |

* cited by examiner

METHOD AND APPARATUS TO MONITOR AN OUTPUT SPEED SENSOR DURING OPERATION OF AN ELECTRO-MECHANICAL TRANSMISSION

TECHNICAL FIELD

This disclosure pertains generally to control systems for electro-mechanical transmissions.

BACKGROUND OF THE INVENTION

The statements in this section merely provide background information related to the present disclosure and may not constitute prior art.

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline and to wheels of the vehicle. Electric machines, operatively connected to an electrical energy storage device, comprise motor/generators operable to generate motive torque for input to the transmission, independently of torque input from the internal combustion engine. The electric machines are further operable to transform vehicle kinetic energy, transmitted through the vehicle driveline, to electrical energy that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electric machines.

The exemplary electro-mechanical transmissions are selectively operative in fixed gear operation and continuously variable operation through actuation of torque-transfer clutches, typically employing a hydraulic circuit to effect clutch actuation. A fixed gear operation occurs when the ratio of the rotational speed of the transmission output member to the rotational speed of the input member is constant, typically due to actuation of one or more torque-transfer clutches. A continuously variable operation occurs when the ratio of the rotational speed of the transmission output member to the rotational speed of the input member is variable based upon operating speeds of one or more electric machines. The electric machines can be selectively connected to the output member via actuation of a clutch, or directly by fixed mechanical connections. Clutch actuation and deactivation is typically effected through a hydraulic circuit, including electrically-actuated hydraulic flow management valves, pressure control solenoids, and pressure monitoring devices controlled by a control module.

During operation, there is a need to monitor sensing systems used for operation, control, and fault detection of the powertrain. One sensing system comprises a vehicle speed sensing system, comprising a sensing system adapted to monitor rotational speed of an output shaft of the transmission. Fault detection in the output shaft rotational speed sensing system typically includes monitoring signal output and detecting presence of an output signal when one is expected, e.g., wherein the engine is running and the transmission is in gear there is an expectation of an output from the sensing system. Fault detection further includes monitoring signal output during ongoing operation and to identify an unexpected change in signal output, e.g., a drop in output by a calibrated speed (e.g., 1000 RPM) when the vehicle is operating above a specified vehicle speed (e.g. 23 MPH). In ongoing operation, especially in an electro-mechanical transmission, rotational speed of the output shaft is utilized in numerous control algorithms, and an uncorrupted signal is preferred, for optimum performance. Therefore, there is a need for additional monitoring thereof. Such a system is described hereinafter.

SUMMARY OF THE INVENTION

An electro-mechanical transmission includes an output. A method to monitor a sensing system adapted to monitor the output includes monitoring rotational speed of a wheel operatively connected to a driveline operatively connected to the output of the electro-mechanical transmission. A first expected output of the transmission based upon the rotational speed of the wheel is determined. A second expected output of the transmission based upon a rotational speed of a torque-generative device operatively connected to the transmission is also determined. The first and second expected outputs and an output of the sensing system are then compared.

DETAILED DESCRIPTION OF A PREFERRED EMBODIMENT

Figure 1:
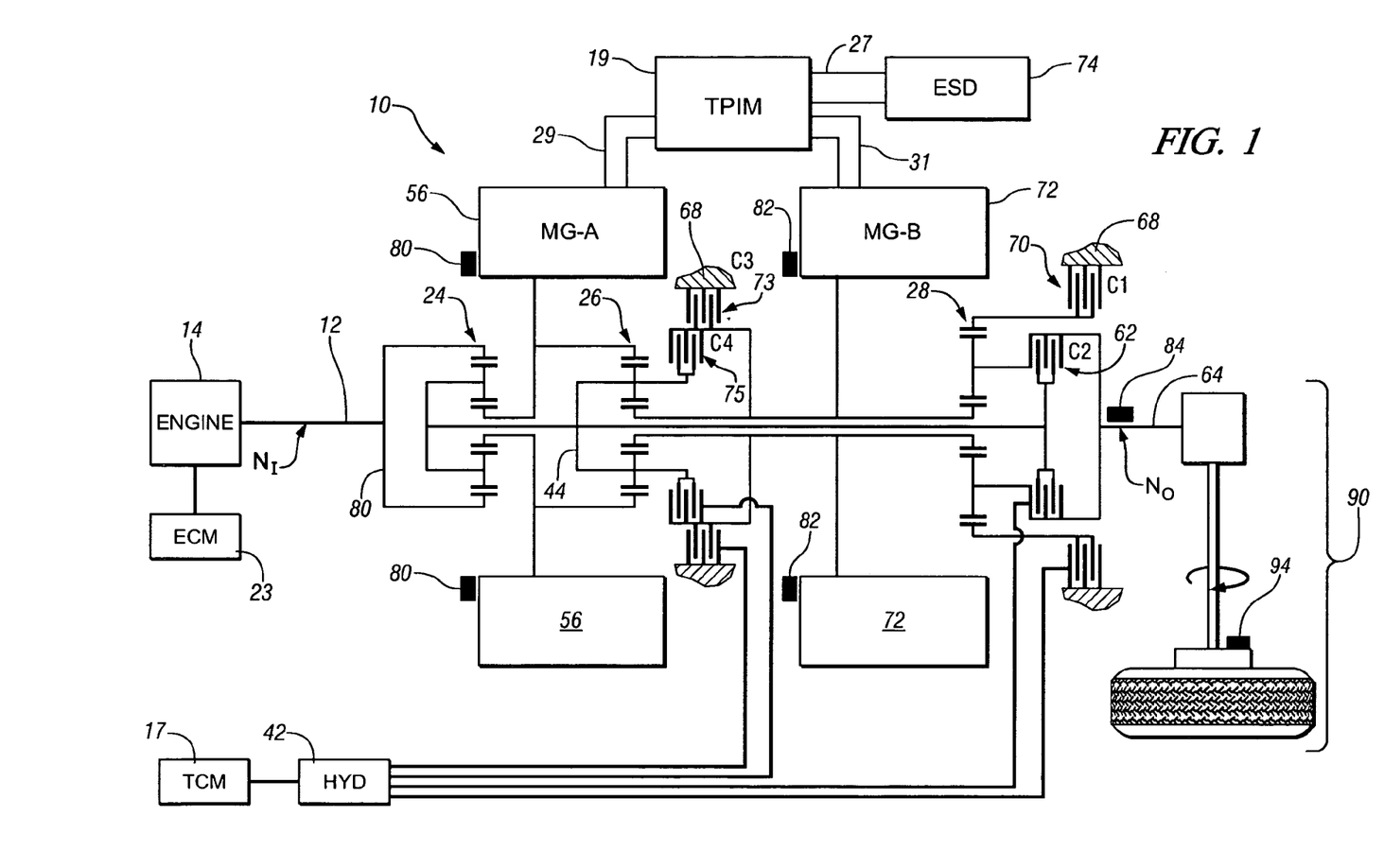
FIG. 1 is a schematic diagram of an exemplary powertrain, in accordance with an embodiment of the present invention.
Figure 2:
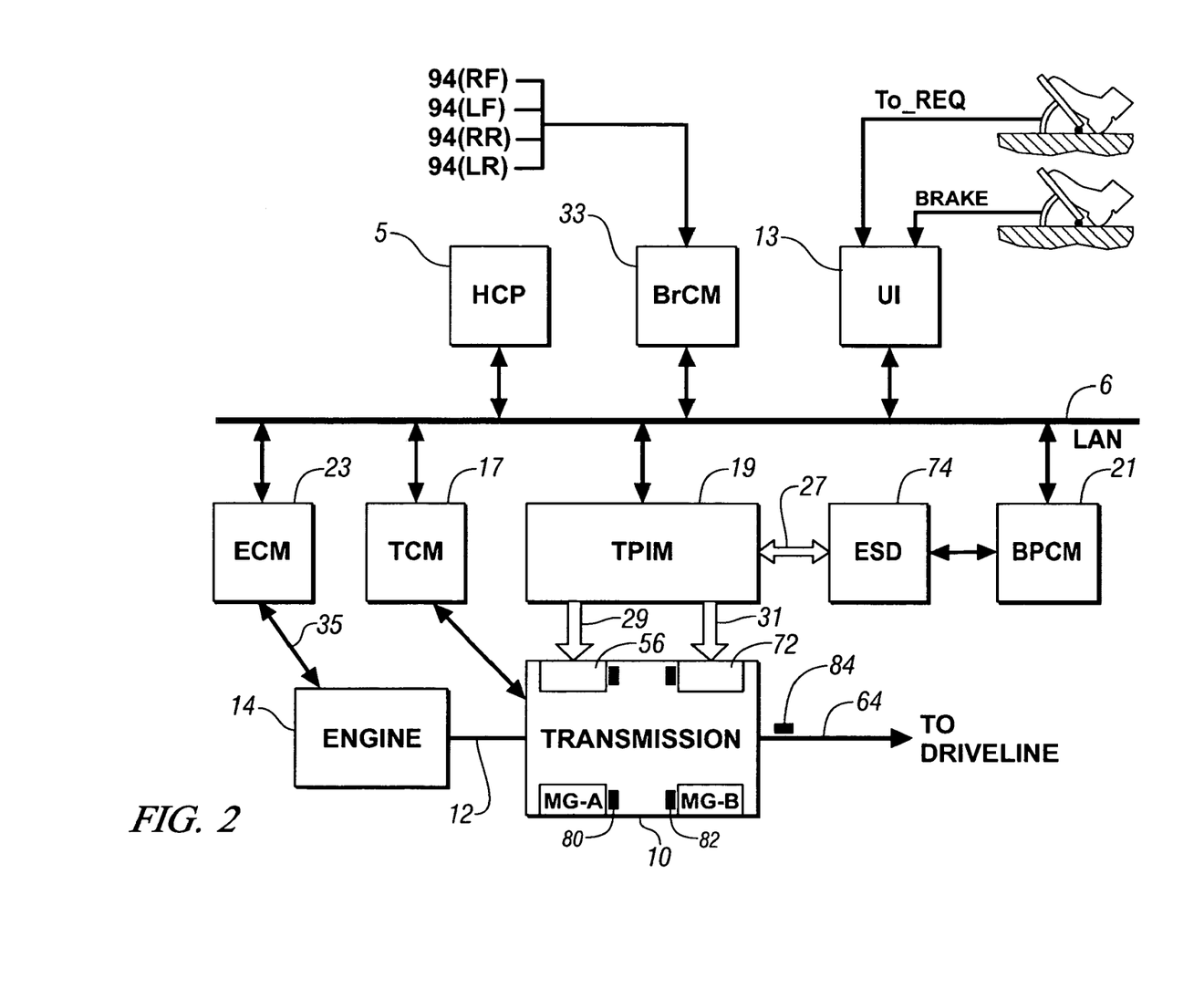
FIG. 2 is a schematic diagram of an exemplary architecture for a control system and powertrain, in accordance with an embodiment of the present invention.

Referring now to the drawings, wherein the depictions are for the purpose of illustrating embodiments of the invention only and not for the purpose of limiting the same, FIGS. 1 and 2 depict a system comprising an engine 14, transmission 10, driveline 90, control system, and hydraulic control circuit (not separately illustrated) which has been constructed in accordance with an embodiment of the present invention. Mechanical aspects of the exemplary transmission 10 are disclosed in detail in commonly assigned U.S. Pat. No. 6,953,409, which is incorporated herein by reference. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$. The rotational speed of the output shaft 64 is preferably monitored using a sensing system 84, comprising a multi-tooth wheel and a sensing element. The multi-tooth wheel is preferably rotatably attached to the output shaft and comprises a device having a plurality of teeth and corresponding detents that are located around a circumference thereof. The sensing element preferably comprises a Hall-effect sensing device mounted in a fixed location adjacent the multi-tooth wheel. The sensing element is operative to sense the teeth and corresponding detents in the multi-tooth wheel as the output shaft rotates, and generate an electrical pulse signal at each transition in the wheel between a tooth and a detent. Rotational speed is determined based upon the number of electrical pulses generated by the sensor over a predetermined elapsed period of time, which is interpretable by a control module, in this application a transmission control module ('TCM') 17. The sensing element is preferably configured to generate the electrical pulse output such that rotational direction can be interpreted therefrom. In the embodiment described, when the output shaft 64 is rotating in a direction resulting in forward propulsion of the vehicle, the electrical pulse has a duration of approximately 45 microseconds. When the output shaft 64 is rotating in a direction resulting in reverse propulsion of the vehicle, the electrical pulse has a duration of approximately 180 microseconds. Thus, the control module regularly and ongoingly monitors duration of one or more signal pulse to determine rotational direction of the output shaft 64.

The exemplary engine 14 comprises a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine, comprising speed $N_E$ and output torque $T_E$ can differ from transmission input speed $N_I$ and engine input torque $T_I$ when a torque management device (not shown) is placed therebetween.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68. Each clutch is preferably hydraulically actuated, receiving pressurized hydraulic fluid from a pump via an electro-hydraulic control circuit.

There is a first electric machine comprising a motor/generator 56, referred to as MG-A, and a second electric machine comprising a motor/generator 72, referred to as MG-B operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 comprises a known variable reluctance device including a resolver stator, operably connected to the stator of each electric machine, and a resolver rotor, operably connected to the rotor of each electric machine. Each resolver 80, 82 comprises a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, To to vehicle wheels. The driveline 90 comprises a transfer case 96 having a known axle ratio, which transmits torque to vehicle drive wheels. Each wheel of the vehicle, including the drive wheels and driven wheels, has a wheel speed sensing system 94 comprising one or more speed sensing devices mounted at the wheel and adapted to measure rotational speed of the respective wheel, including right-front (RF), right-rear (RR), left-front (LF), and left-rear (LR) wheels. The output of each wheel speed sensing system 94 is monitored by a brake control module ('BrCM') 33.

The transmission 10 receives input torque from the torque-generative devices, including the engine 14, and MG-A 56 and MG-B 72, referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A 56 and MG-B 72. The distributed control module architecture includes engine control module (ECM) 23, transmission control module (TCM) 17, battery pack control module (BPCM) 21, and TPIM 19, and the BrCM 33. A hybrid control module (HCP) 5 provides overarching control and coordination of the aforementioned control modules. There is a User Interface (UI) 13 operably connected to a plurality of devices through which a vehicle operator typically controls or directs operation of the powertrain including the transmission 10, including an operator torque request (To_req) and operator brake request (BRAKE). Exemplary vehicle input devices to the UI 13 include an accelerator pedal, a brake pedal, a transmission gear selector, and, a vehicle speed cruise control system. Each of the aforementioned control modules communicates with other control modules, sensors, and actuators via a local area network (LAN) bus 6. The LAN bus 6 allows for structured communication of control parameters and commands among the various control modules. The specific communication protocol utilized is application-specific. The LAN bus and appropriate protocols provide for robust messaging and multi-control module interfacing between the aforementioned control modules, and other control modules providing functionality such as antilock braking, traction control, and vehicle stability.

The HCP 5 provides overarching control of the hybrid powertrain system, serving to coordinate operation of the ECM 23, TCM 17, TPIM 19, and BPCM 21, including communicating with the BrCM. Based upon various input signals from the UT 13 and the powertrain, including the battery pack, the HCP 5 generates various commands, including: the operator torque request ($T_{O\_REQ}$), the engine input torque $T_I$, clutch torque, ($T_{CL\_N}$) for the N various torque-transfer clutches C1, C2, C3, C4 of the transmission 10; and motor torques $T_A$ and $T_B$ for MG-A 56 and MG-B 72. The TCM 17 is operatively connected to the electro-hydraulic control circuit 42, including for monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine input torque command from the HCP 5, and generates a desired axle torque, and an indication of actual engine input torque, Tɪ, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 (which translate to transmission input speed, $N_I$) manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_N}$) for each of the N clutches, i.e., C1, C2, C3, and C4, and rotational output speed, No, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, amp-hour throughput, battery temperature, battery voltage and available battery power.

The BrCM 33 executes vehicle functions related to braking control, traction control, and vehicle acceleration management. The BrCM is signally connected to the wheel speed sensors 94 and functions to acquire data therefrom and determines absolute wheel speeds, $N_{WHL}$, for each of the wheels, which it communicates to the TCM and other controllers via the LAN.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The exemplary two-mode, compound-split, electro-mechanical transmission operates in one of several operating range states comprising fixed gear operation and continuously variable operation, described with reference to Table 1, below.

TABLE 1

| Transmission Operating Range State (Op_range) | Actuated Clutches | |
| --- | --- | --- |
| Mode I - (MI) | C1 70 | |
| Fixed Gear Ratio 1 (FG1) | C1 70 | C4 75 |
| Fixed Gear Ratio 2 (FG2) | C1 70 | C2 62 |
| Mode II - (MII) | C2 62 | |
| Fixed Gear Ratio 3 (FG3) | C2 62 | C4 75 |
| Fixed Gear Ratio 4 (FG4) | C2 62 | C3 73 |

The various transmission operating range states described in the table indicate which of the specific clutches C1, C2, C3, and C4 are engaged or actuated for each of the operating range states. A first continuously variable operating range state, i.e., Mode I, is selected when clutch C1 70 is actuated in order to "ground" the outer gear member of the third planetary gear set 28. The engine 14 can be either on or off. A second continuously variable operating range state, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating. Other factors outside the scope of this disclosure affect when the electric machines MG-A 56 and MG-B 72 operate as motors and generators, and are not discussed herein.

Mode I and Mode II are characterized by single clutch applications, i.e., either clutch C1 62 or C2 70, and by the controlled speed and torque of the electric machines MG-A 56 and MG-B 72, which can be referred to as a continuously variable transmission mode. Certain operating rage states are described below in which fixed gear ratios are achieved by applying an additional clutch. This additional clutch may be clutch C3 73 or C4 75, as shown in the table, above. When the additional clutch is applied, fixed gear operation of input-to-output speed of the transmission, i.e., $N_I/N_O$, is achieved. During fixed gear operation, the rotations of machines MG-A 56 and MG-B 72, i.e., $N_A$ and $N_B$, are dependent on internal rotation of the mechanism as defined by the clutching and proportional to the input speed measured at shaft 12. Furthermore, the rotational speeds, $N_A$ and $N_B$, are directional in nature, such that a positive sign in the speed of either of the machines corresponds to a positive direction translating to forward movement of the vehicle and a negative sign in the speed of either of the machines corresponds to a negative direction translating to reverse movement of the vehicle.

When the transmission is operated in one of the fixed-gear modes, the transmission output speed, $N_O$, can be determined based upon the input speed, $N_I$, multiplied by the selected gear ratio for the fixed-gear mode, i.e., $$N_O = N_I \times GR.$$

When the transmission is operated in one of the continuously variable ratios, the output speed, $N_O$, can be determined by calculating a mathematical average of the rotational speeds of the electric machines, i.e., $$N_O = (N_A + N_B)/2.$$

In response to an operator's action, as captured by the UI 13, the supervisory HCP control module 5 and one or more of the other control modules determine the operator torque request to be executed at shaft 64. Final vehicle acceleration is affected by other factors, including, e.g., road load, road grade, and vehicle mass. The transmission operating range state is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The transmission operating range state may be predicated on a powertrain torque demand caused by a control module command to operate one of the electric machines as an electrical generator or as an electric motor. The transmission operating range state can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The energy storage system and electric machines MG-A 56 and MG-B 72 are electrically-operatively coupled for power flow therebetween. Furthermore, the engine, the electric machines, and the electro-mechanical transmission are mechanically-operatively coupled to transmit power therebetween to generate a power flow to the output. In Mode I operation, the transmission operates as an input-split electrically variable transmission (EVT). In Mode II operation, the transmission operates as a compound-split EVT. While operating in either of these two modes, the control system performs closed loop control on an engine speed which optimizes fuel economy while still meeting the torque request and given power constraints. It then commands motor speeds to vary the input-to-output speed ratio to accelerate the vehicle, in response to the operator torque request. Through use of the two additional clutches, the transmission also has the capability of achieving one of four fixed gear ratios. While operating in a fixed gear, the vehicle acts as a parallel hybrid and the motors are used only for boosting and braking/regeneration the vehicle.

In operation, an operating mode, i.e., one of the fixed gear and continuously variable operating range states is determined for the exemplary transmission based upon a variety of operating characteristics of the powertrain. This includes an operator torque request, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electric machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system.

Figure 3:
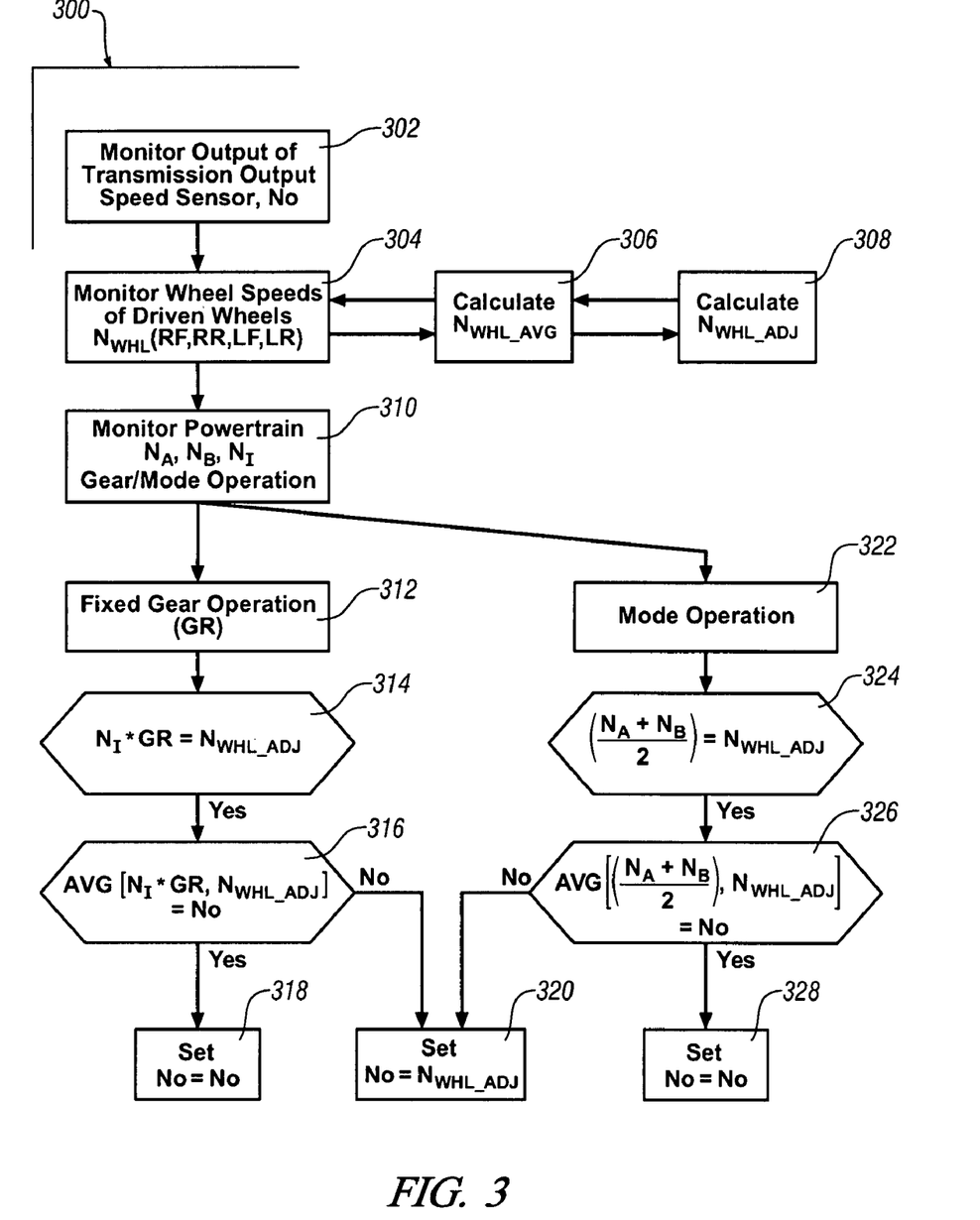
FIG. 3 is an algorithmic flowchart, in accordance with an embodiment of the present invention.

Referring now to FIG. 3, and referencing the transmission described in FIGS. 1 and 2 and Table 1, specific aspects of the transmission and control system are described herein. FIG. 3 depicts a flowchart 300, representing algorithms executed in the various control modules. The algorithms act to monitor a sensing system adapted to monitor output of the electro-mechanical transmission, depicted herein as monitoring rotational speed, $N_O$, of the output shaft 64 using sensing system 84. The algorithms are preferably executed during each 25 ms loop cycle, and preferably executed in a manner to achieve a decision with regard to presence of a fault within 200 milliseconds of its occurrence.

In operation, the signal output from the transmission output speed sensor 84 is monitored (302). Output of a first sensor is monitored (304), comprising the signal output, $N_{WHL}$, from one or more of the wheel speed sensors 94, preferably the driven wheels, i.e., those operatively connected to the driveline 90 operatively connected to the output shaft 64 of the electro-mechanical transmission. Alternatively, input from only one of the driven wheels is monitored. An average wheel speed, $N_{WHL\_AVG}$, is determined based upon the inputs from the wheel speed sensors (306). An adjusted average wheel speed, $N_{WHL\_AVG}$, is determined based upon the inputs from the wheel speed sensors, adjusted based upon gear reductions occurring through the transfer case 96, typically referred to as an axle ratio (308).

The powertrain operation is monitored, to determine the input speed, $N_I$, the speeds of the electric motors $N_A$, $N_B$, and the transmission operating range state, i.e., one of MI, MII, FG1, FG2, FG3, FG4 (310).

A first expected output of the transmission is determined based upon the output of the wheel speed sensors, and typically comprises the adjusted average wheel speed, $N_{WHL\_ADJ}$.

A second expected output of the transmission is determined, based upon the operation of the powertrain. When the transmission is operating in one of the fixed gear modes (312), the second expected output is determined based upon the input speed from the engine and the fixed gear ratio, i.e., $N_I \times GR$, and compared to the first expected output, $N_{WHL\_ADJ}$ (314). When the values of these expected outputs are in agreement, within allowable measurement errors, an average (AVG) of the first and second expected outputs is calculated and the rotational speed, $N_O$, of the output shaft 64 determined using sensing system 84 is compared therewith (316). Under a condition wherein the rotational speed, $N_O$, of the output shaft determined using sensing system 84 agrees with the average (AVG) of the first and second expected outputs within allowable measurement errors, the control system uses the rotational speed, $N_O$, of the output shaft 64 using sensing system 84 for various engine and powertrain control operations (318). Under a condition wherein the rotational speed, $N_O$, of the output shaft determined using sensing system 84 does not agree with the average of the first and the second expected outputs, within allowable measurement errors, the control system uses the adjusted average wheel speed, $N_{WHL\_ADJ}$, as a substitute the output speed for various engine and powertrain control operations (320).

When the transmission is operating in one of the continuously variable modes (322), the second expected output is determined based upon the average rotational speed of the electric machines, i.e., $(N_A+N_B)/2$, and compared to the first expected output, $N_{WHL\_ADJ}$ (324). When the values of these expected outputs are in agreement, within allowable measurement errors, an average of the first and second expected outputs is determined, and compared to the rotational speed, $N_O$, of the output shaft 64 determined using sensing system 84 (326). Under a condition wherein the rotational speed, $N_O$, of the output shaft determined using sensing system 84 agrees with the average of the first and the second expected outputs, within allowable measurement errors, the control system uses the rotational speed, $N_O$, of the output shaft 64 using sensing system 84 for various engine and powertrain control operations (328). Under a condition wherein the rotational speed, $N_O$, of the output shaft determined using sensing system 84 does not agree with the average of the first and the second expected outputs, within allowable measurement errors, the control system uses the adjusted average wheel speed, $N_{WHL\_ADJ}$, as substitute for the output speed for various engine and powertrain control operations (320).

Furthermore, during ongoing operation the electrical pulse output of the sensing element is monitored to determine rotational direction of the output shaft 64, as previously described. The rotational direction of the transmission output speed, $N_O$, is also determined, under all operating conditions, by mathematically adding the signed rotational speeds of the electric machines and determining the sign of the resultant:

$$N_A+N_B,$$

wherein a positive resultant of adding the numbers corresponds to forward direction, and a negative resultant of adding the numbers corresponds to reverse direction. Thus, the direction of the electrical pulse output is compared to the resultant sum of the motor speeds to determine whether the directional output from the sensor is correct. This is used to monitor the sensor and identify a fault associated therewith.

The invention has been described with specific reference to the disclosed embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to monitor a sensing system configured to monitor rotational speed of an output shaft of an electro-mechanical transmission, comprising:
   monitoring rotational speed of a wheel operatively connected to a driveline operatively connected to the output shaft of the electro-mechanical transmission;
   determining a first expected rotational speed of the output shaft of the transmission based upon the rotational speed of the wheel;
   determining rotational speeds of first and second electric machines operatively connected to the transmission;
   calculating a second expected rotational speed of the output shaft of the transmission based upon the rotational speeds of first and second electric machines when the electro-mechanical transmission is operating in a continuously variable operating mode;
   comparing the first and second expected rotational speeds of the output shaft and a signal output from the sensing system configured to monitor rotational speed of the output shaft of the electro-mechanical transmission; and
   wherein comparing the first and second expected rotational speeds of the output shaft and the signal output from the sensing system configured to monitor the rotational speed of the output shaft of the electro-mechanical transmission further comprises: averaging the first and second expected rotational speeds of the output shaft of the transmission; and comparing the signal output from the sensing system to the average of the first and second expected rotational speeds of the output shaft of the transmission.

2. The method of claim 1, wherein the sensing system configured to monitor rotational speed of the output shaft of the electro-mechanical transmission comprises a sensor and target wheel configured to monitor the rotational speed of the output shaft of the transmission.

3. The method of claim 1, wherein determining the first expected output of the transmission based upon the rotational speed of the wheel comprises calculating the first expected output based upon the rotational speed of the wheel and an axle ratio for the driveline.

4. The method of claim 1, wherein calculating the second expected rotational speed of the output shaft of the transmission based upon the rotational speeds of the first and second electric machines comprises calculating a mathematical average of the rotational speeds of the first and second electric machines.

5. Method to detect a fault in a sensor and target wheel adapted to monitor rotational speed of an output shaft of an electro-mechanical transmission, comprising:
   monitoring rotational speed of a wheel operatively connected to a driveline operatively connected to the output of the electro-mechanical transmission;
   determining a first expected output of the transmission based upon the rotational speed of the wheel;
   determining a second expected output of the transmission based upon a rotational speed of a torque-generative device operatively connected to the transmission;
   comparing an output of the sensor with the first and second expected outputs of the transmission; and
   identifying a fault in the output of the sensor when the first and second expected outputs of the transmission differ by less than a predetermined threshold, and, the output of the sensor differs from an average of the first and second expected outputs of the transmission by greater than a predetermined threshold.

6. The method of claim 5, wherein determining the second expected output of the transmission based upon rotational speed of a torque-generative device operatively connected to the transmission comprises:
   determining rotational speeds of first and second electric machines operatively connected to the transmission; and,
   calculating the second expected output of the transmission based upon the rotational speeds of first and second electric machines when the electro-mechanical transmission is operating in a continuously variable operating mode.

7. The method of claim 6, wherein the second expected output of the transmission based upon the rotational speeds of the first and second electric machines comprises a mathematical average of the rotational speeds of the first and second electric machines.

8. The method of claim 5, wherein determining the second expected output of the transmission based upon rotational speed of a torque-generative device operatively connected to the transmission comprises:
monitoring rotational speed of an internal combustion engine operatively connected to an input to the electro-mechanical transmission; and,
calculating the second expected output of the transmission based upon the rotational speed of the internal combustion engine and a gear ratio of the transmission when the electro-mechanical transmission is operating in a fixed gear mode.

9. Method to control operation of a powertrain adapted to transmit power to a wheel via a driveline, the powertrain comprising an internal combustion engine operatively connected to an electro-mechanical transmission selectively operative in one of fixed gear and continuously variable operating modes, the method comprising:
monitoring rotational speed of the wheel operatively connected to the driveline operatively connected to an output of the transmission;
determining a first expected output of the transmission based upon the rotational speed of the wheel;
determining a second expected output of the transmission based upon a rotational speed of a torque-generative device operatively connected to the transmission;
comparing the first and second expected outputs and an output of a sensing system adapted to monitor rotational speed of the output of the transmission;
identifying a fault in the sensing system adapted to monitor the rotational speed of the electro-mechanical transmission when the output of the sensing system differs from an average of the first and second expected outputs of the transmission by less than a predetermined threshold; and,
controlling operation of the transmission based upon the first expected output of the transmission when a fault is identified.

10. The method of claim 9, wherein the sensing system adapted to monitor an output of the electro-mechanical transmission comprises a sensor and target wheel adapted to monitor rotational speed of an output shaft of the transmission.

11. The method of claim 10, wherein determining the second expected output of the transmission based upon rotational speed of a torque-generative device operatively connected to the transmission comprises:
determining rotational speeds of first and second electric machines operatively connected to the transmission; and,
calculating the second expected output of the transmission based upon the rotational speeds of first and second electric machines when the electro-mechanical transmission is operating in a continuously variable operating mode.

12. The method of claim 11, wherein the second expected output of the transmission based upon the rotational speeds of the first and second electric machines comprises a mathematical average of the rotational speeds of the first and second electric machines.

13. The method of claim 9, wherein determining the second expected output of the transmission based upon rotational speed of a torque-generative device operatively connected to the transmission comprises:
monitoring rotational speed of an internal combustion engine operatively connected to an input to the electro-mechanical transmission; and,
calculating the second expected output of the transmission based upon the rotational speed of the internal combustion engine and a gear ratio of the transmission when the electro-mechanical transmission is operating in a fixed gear mode.

14. The method of claim 13, further comprising:
monitoring duration of the signal output from the sensing system adapted to monitor rotational speed of the output of the transmission; and,
determining a direction of rotation of the output of the transmission based thereon.

15. The method of claim 14, further comprising: comparing the direction of rotation of the output of the transmission determined based upon the duration of the signal output from the sensing system to a direction of rotation of the first and second electric machines.

* * * * *